(12) United States Patent
Forgeat et al.

(10) Patent No.: US 10,091,680 B2
(45) Date of Patent: Oct. 2, 2018

(54) IDENTIFICATION OF SERVICE AREA SWAPPING NOISE

(71) Applicant: Telefonaktiebolaget L M Ericsson (publ), Stockholm (SE)

(72) Inventors: Julien Forgeat, San Jose, CA (US); Richard Carlsson, Stockholm (SE); Tomas Goldbeck-Löwe, Saltsjö-Boo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 670 days.

(21) Appl. No.: 14/429,939

(22) PCT Filed: Sep. 21, 2012

(86) PCT No.: PCT/EP2012/068709
§ 371 (c)(1),
(2) Date: Mar. 20, 2015

(87) PCT Pub. No.: WO2014/044325
PCT Pub. Date: Mar. 27, 2014

(65) Prior Publication Data
US 2015/0230115 A1  Aug. 13, 2015

(51) Int. Cl.
*H04W 24/10* (2009.01)
*H04W 60/02* (2009.01)
(Continued)

(52) U.S. Cl.
CPC .......... *H04W 24/10* (2013.01); *H04W 4/021* (2013.01); *H04W 48/16* (2013.01); *H04W 60/02* (2013.01); *H04W 64/006* (2013.01)

(58) Field of Classification Search
CPC ..... H04W 24/10; H04W 4/021; H04W 48/16; H04W 60/02; H04W 64/006
(Continued)

(56) References Cited

U.S. PATENT DOCUMENTS

| 2009/0017823 A1 | 1/2009 | Sachs et al. |
| 2010/0194632 A1 | 8/2010 | Raento et al. |

(Continued)

FOREIGN PATENT DOCUMENTS

WO    9957821 A1    11/1999

*Primary Examiner* — Huy D Vu
*Assistant Examiner* — Nizam Ahmed
(74) *Attorney, Agent, or Firm* — Murphy, Bilak & Homiller, PLLC

(57) ABSTRACT

Methods and apparatus are provided for collecting and detecting service area (SA) swapping noise in a wireless network including a plurality of SAs serving a plurality of devices. By receiving SA updates from the stationary devices of the plurality of devices changes in SA identifiers of the SA updates associated with each stationary device are detected. For each stationary device, if two or more SAs are detected to have changed for the stationary device, then these SAs are identified as contributing to SA swapping noise. With this in mind, SA transitions between the identified SAs for a non-stationary device of the plurality of devices are not interpreted as movement of the non-stationary device. However, SA transitions for the non-stationary device from these SAs to other SAs not contributing to SA swapping noise are interpreted as a change of location or movement of the non-stationary device.

25 Claims, 9 Drawing Sheets

(51) Int. Cl.
*H04W 4/021* (2018.01)
*H04W 48/16* (2009.01)
*H04W 64/00* (2009.01)

(58) Field of Classification Search
USPC .......................................................... 370/252
See application file for complete search history.

(56) References Cited

U.S. PATENT DOCUMENTS

2010/0202406 A1    8/2010  Feder et al.
2011/0021212 A1*   1/2011  Chen ...................... H04W 4/02
                                                    455/456.3
2011/0059741 A1    3/2011  Klein
2011/0124334 A1*   5/2011  Brisebois .............. H04W 48/16
                                                    455/434

* cited by examiner

IDENTIFICATION OF SERVICE AREA SWAPPING NOISE

TECHNICAL FIELD

The present invention relates to methods and apparatus for identifying service area swapping noise in wireless networks to assist mobility analysis of non-stationary client devices. In particular, the invention relates to methods and apparatus for identifying service area swapping noise by determining whether two or more service areas serve the same stationary client device.

BACKGROUND

Devices connected in wireless networks can create a lot of data related to the mobility of the devices. This data can be used in many application areas. It is understood that the more connected "things" become, the more data related to mobility of a device becomes available. In particular, by collecting location data from all wirelessly connected devices it is possible to construct models of how these devices are moved around. Wireless networks that implement mechanisms to establish a connection with their wireless devices may keep track of device locations for paging and/or management of network resources.

Location information about the mobility of devices may be generated, for example:

- in the device when it performs measurements on the signal strengths towards nearby radio base stations or access points in order to know which radio base station/access point to use for wireless communications;
- in the wireless network when the device reports its location or connects to a radio base station/access point in the network. Devices may typically report their location whenever they move between larger pre-defined service areas, when they are in an active state, receive or send communications, and/or on a periodic basis.

While this location information is primarily collected and maintained to facilitate the paging of the devices, it can also be used to build statistics and reports on the devices' locations by matching the service areas with a geo-spatial location.

Wireless communication networks may comprise or represent any wireless network used for wireless communications with devices connected to the wireless network. Examples of wireless networks include, but are not limited to, wireless networks such as the Worldwide Interoperability for Microwave Access (WiMAX), wireless local area networks (WLAN) based on the Institute of Electrical and Electronics Engineers' (IEEE) 802.11 standards e.g. Wi-Fi networks, or wireless networks based on cellular or satellite technologies such as femtocell networks, Global System for Mobile Communications (GSM), Wideband Code Division Multiple Access (W-CDMA), CDMA2000 or Long Term Evolution (LTE)/LTE Advanced mobile networks or any $2^{nd}$, $3^{rd}$ or $4^{th}$ Generation and beyond wireless networks.

The device(s) or connected device(s) as described herein may comprise or represent any device that is capable of connecting to or communicating over a wireless communication network. Non-stationary devices may comprise or represent any device that is mobile or moveable and connects to or communicates over a wireless network. Stationary devices may comprise or represent any device that is considered fixed or not typically moved and connects to or communicates over a wireless network. Examples of non-stationary devices include, but are not limited to, wireless devices such as mobile phones, terminals, smart phones, satellite phones, portable computing devices such as lap tops, handheld devices, tablets, netbooks, computers, personal digital assistants, and in-vehicle devices such as vehicle tracking systems or any other wireless communication device that is mobile. Examples of stationary devices include, but are not limited to, wireless devices such as sensors, smart meters or utility meters.

FIG. 1a is a schematic illustration of a wireless network 100 that includes a plurality of service areas (SAs) 102a-102d serving a plurality of devices 104a-104f. Each of the SAs 102a-102d may comprise or represent an area or region that is serviced by a wireless transceiver that allows the devices 104a-104f to connect to or communicate with or over the wireless network 100. Examples of SAs include, but are not limited to, SAs such as cells in cellular mobile networks that are served by base stations, wireless hotspots in a wireless LAN or WiFi network that are served access points, or satellite coverage areas or footprints serviced by satellites, or any area that is served by a transmitter/transceiver for connecting a device to a wireless network.

The SAs 102a-102d have service area identifiers (SA-ids) SA1-SA4, and the plurality of devices 104a-104f include a plurality of non-stationary devices 104d-104e and a plurality of stationary devices 104a-104c. It can be seen that SA 102a (SA-id: SA1) provides wireless network coverage for non-stationary device 104d, and SA 102b (SA-id: SA2) provides wireless network coverage for non-stationary devices 104e and 104d.

The wireless network 100 described in FIG. 1a may maintain information on the location of the non-stationary devices. This information may be gathered from location updates or SA updates from the plurality of devices 104a-104e. SA updates may comprise or represent any location information associated with a device and the service area that is serving the device. Examples of SA updates may include, but are not limited to, an SA update such as data representative of location information such as a SA identifier identifying the SA, a device identifier, and/or a time stamp (this may be added by the network or device). The device identifier may be any identifier that can be used to identify the SA updates associated with that device.

The SA updates may be gathered and stored by the wireless network 100 from the plurality of devices 104a-104e, as shown in Table 1 below:

TABLE 1

Latest SA update records maintained by the network

| SA identifier | Device identifier | Time |
|---|---|---|
| SA 1 | NSD1 | 2012 07 06 14:23:37 |
| SA 2 | NSD2 | 2012 07 06 14:23:42 |
| SA 2 | NSD3 | 2012 07 06 14:23:51 |

Each row of the table represents the information gathered from SA or location updates that include the SA identifier (or SA-id), the device identifier, and a time stamp of the latest SA update recorded by the wireless network 100. The device identifier may comprise or represent any identifier that may be used to uniquely identify the SA updates in relation to that device.

By using information about the SA that a device has been in at a specific time, it is possible to describe the mobility of that device. This can be done by a system integrated with a wireless network 100 that can collect all events generated from the devices. In a system integrated with the wireless network 100, it is also possible to directly use information about the layout of the wireless network 100 to calculate an estimated location of the device based on the SA-ids reported.

With the increasing popularity of devices that connect to wireless networks such as advanced smart phones and other advanced mobile devices it is now possible to create systems that track the mobility of its users without being integrated with the wireless network 100. In such a system an application (e.g. an Android® application) could collect the information of nearby SAs from the device. This information may be sent over the Internet to a server that uses a publicly available database (e.g. location-api.com or Google Location API) of the location of the wireless network transceivers (e.g. access points or radio base stations) to estimate the location of the device. A system implemented in this way could be called an over-the-top (OTT) location solution. The information of nearby SAs from the device may be used to notify the user of nearby goods and services (e.g. shops and restaurants) that may be of interest to the user.

In reality, the coverage areas of each SA are never mutually exclusive; SAs can overlap to maintain optimum coverage for the devices. As a result, for a given physical location, a device can be attached to one or more distinct SAs. Moreover, for a given physical location, the SA to which a device is attached (or connected) can change in time.

FIG. 1b is a schematic illustration of the wireless network 100 in which some of the plurality of SAs 102a-102d now overlap such that multiple SAs serve the same non-stationary device 104d. This is an example of device 104d having coverage of two overlapping SAs 102c and 102d. This may occur because the coverage area of any of the SAs 102a-102d can change during the management of the wireless network 100, e.g. the wireless network 100 may control the coverage of each SA or move the wireless transceivers serving each SA. As an example, SA coverage may increase to allow more client devices to connect to the wireless network 100 during peak periods and decrease during non-peak periods.

In wireless network 100, non-stationary device 104d (e.g. NSD1) is covered by both SAs 102c and SA 102d (SA3 and SA4) and will report its location as being either SA 102c or SA 103d (SA3 or SA4). This means that, depending on network load or signal strengths, it is possible for device 104d to change between SA 102c and SA 102d over time, which is illustrated in Table 2 below:

TABLE 2

Latest 4 SA update records corresponding to NSD1

| SA identifier | Device identifier | Time |
| --- | --- | --- |
| SA3 | NSD1 | 2012 07 06 14:23:37 |
| SA4 | NSD1 | 2012 07 06 15:21:42 |
| SA4 | NSD1 | 2012 07 06 16:25:51 |
| SA3 | NSD1 | 2012 07 06 17:29:04 |

Because of this, it is actually not possible to assume that a change of SA identifier corresponds to a change of location by the non-stationary device 104d or implies actual physical movement of the non-stationary device 104d. In cases where the exact layout of the wireless network 100 and the coverage of its SA 102a-102d is unknown or cannot be accessed (e.g. in the case an OTT solution) it is not possible to know that a transition between two SAs represents a movement nor know anything about the likelihood of it actually representing movement.

As future wireless networks will consist of overlapping networks (e.g. WiFi, 2G, 3G, and LTE/LTE Advanced and others) and as the coverage areas of SAs of future wireless networks tend to get smaller and smaller, devices will be able to connect to more SA while remaining in the same location. This means there will be more uncertainty as to whether a SA transition represents actual movement of non-stationary devices, which makes the problem of using SA-ids as an indication of actual movement of the device more problematic. This problem is illustrated in FIG. 1c for the case of a cellular mobile network.

FIG. 1c is a schematic illustration of an example mobile network 110 in which the SAs are outdoor cells 112a-112d of the mobile network 110, some of which overlap with an indoor cell 102e (e.g. a femtocell or other indoor SA), which provides non-stationary device 104d (e.g. NSD1) with mobile network coverage within the building 120.

Considering this topology, there are:

Four cells 112a-112d (e.g. Cells 1, 2, 3, and 4) covering the area surrounding the building 120;

One indoor cell 102e (e.g. cell i) covering building 120; and

One non-stationary device 104d (e.g. NSD1) in the building 120.

With this topology, non-stationary device 104d is attached to cell 112e (e.g. cell i) because it is within the building 120. However, non-stationary device 104d may also become attached to cells 112a or 112b (e.g. Cell 1 or Cell 2) when it is close to the windows of building 120 or any other location where the signal strength of cell 102e (e.g. cell i) is lower than the outdoor cells 102a and 102b.

As a result, an application using mobile network location update logs to monitor the number of people carrying non-stationary devices such as non-stationary device 104d coming in and out of building 120 cannot interpret a transition from cell 112e (cell i) to cell 112a (Cell 1) or from cell 112e (Cell i) to cell 112b (Cell 2) as a non-stationary device leaving the building. On the other hand, a transition towards cells 112c and 112d (Cells 3 and 4) or any other cell that does not have coverage over the building can be safely interpreted by the application as a non-stationary device 104d leaving the building 120.

In a mobile network 110, a non-stationary device 104d-104f is very often in the coverage of more than one cell of the mobile network 110. When performing mobility analytics using mobile network cell/location update logs provided by the mobile network 110, this means that for a given subscriber, a change of cell cannot always be interpreted as a change of location. This is referred to as SA or cell swapping noise. This issue is applicable to other wireless networks that receive SA updates from devices within the network.

Therefore, there is a significant need to provide a mechanism for efficiently detecting SA swapping noise in wireless network service update logs and accurately determine when a non-stationary device 104d has changed location within a wireless network.

SUMMARY

It has been recognised here that whilst there are certain mechanisms for determining when a non-stationary device has changed location using SA update logs, none of the relevant systems can take into account SA swapping noise to determine when a non-stationary device changes location. The present invention provides the advantages of detecting SA swapping noise in SA update records and more accurately determines when a non-stationary device changes location by taking into account the detected SA swapping noise.

According to a first aspect of the present invention there is provided a method of operating a location apparatus for collecting and detecting SA swapping noise within a wireless network. The wireless network including a plurality of SAs serving a plurality of devices includes stationary devices and non-stationary devices, and a SA overlap database. The SA overlap database including a plurality of SA overlap records, where each SA overlap record includes a pair of SA identifiers from the plurality of SAs. Receiving SA updates from the plurality of devices, where each SA update includes a device identifier identifying at least one of the devices and SA identifier of a SA serving at least one of the devices. Determining whether each received SA update is associated with a stationary device. If the received SA update is associated with a stationary device, then performing the steps of comparing the received SA update with a corresponding previous SA update associated with the stationary device, and inserting a SA overlap record into the SA overlap database, when the received SA update is different to the corresponding previous SA update, the SA overlap record including the SA identifiers of the received SA update and the corresponding previous SA update associated with the stationary device.

As an option, inserting the SA overlap record is performed when the SA overlap database does not include a SA overlap record corresponding to the SA identifiers of the received SA update and the corresponding previous SA update. Additionally or alternatively, the step of determining further includes checking a list of devices associated with identified stationary devices using the device identifier of each received SA update. Optionally, the step of determining further includes checking a list of devices associated with identified non-stationary devices using the device identifier of each received SA update. As an option, the list of devices comprises a device database including device records associated with identified devices. Alternatively or additionally, the list of devices includes one or more ranges of reserved identifiers of stationary or non-stationary devices.

Optionally, the SA overlap records may include a time stamp indicating when the SA overlap record was inserted into the SA overlap database, the method further includes the step of maintaining the SA overlap database by removing one or more SA overlap records based on the time stamps. Additionally, maintaining the SA overlap database may further include removing one or more SA overlap records when a SA overlap between a pair of SAs is no longer detected.

As an option, if it is determined that the received SA update corresponds to a non-stationary device, the method further includes storing the received SA update for the non-stationary device. Additionally, performing a motion analysis based on the stored received SA updates for one or more non-stationary devices and the SA overlap database. As an option, the motion analysis includes, for each non-stationary device, the steps of: detecting whether a SA overlap record exists for pairs of SA identifiers of stored SA updates of a non-stationary device, and determining the non-stationary device to be motionless when a SA overlap record exists. Optionally, storing the received SA updates further includes storing the received SA update for the non-stationary device with a time stamp. As an option, detecting further includes detecting whether a SA overlap record exists for pairs of SA identifiers of consecutive stored SA updates for the non-stationary device.

Optionally, detecting further includes detecting whether pairs of SA identifiers are the same, and if not, performing the step of detecting whether a SA overlap record exists for the pairs of SA identifiers. Additionally, determining may further include determining the non-stationary device to be motionless when pairs of SA identifiers are the same or when a SA overlap record exists.

According to a second aspect of the present invention there is provided a method of performing a mobility analysis within a wireless network including a plurality of SAs serving a plurality of devices, the plurality of devices including stationary devices and non-stationary devices, and a SA overlap database. The SA overlap database including a plurality of SA overlap records, where each SA overlap record includes a pair of SA identifiers from the plurality of SAs, the pairs of SA identifiers associated with a pair of SAs serving a least one of the stationary devices. The method includes receiving location information associated with one or more non-stationary devices. The location information includes stored SA updates associated with the non-stationary devices. Each SA update includes the SA identifier of a SA serving the non-stationary device. Detecting, for each non-stationary device, whether a SA overlap record exists for pairs of SA identifiers of stored SA updates of a non-stationary device. Determining, for a pair of SA identifiers, that the non-stationary device is motionless when an SA overlap record exists.

As an option, the stored SA updates associated with the non-stationary devices further include a time stamp, and the step of detecting further includes detecting, for each non-stationary device, whether a SA overlap record exists for pairs of SA identifiers of consecutive stored SA updates for the non-stationary device.

Optionally, detecting further includes detecting, for each non-stationary device, whether pairs of SA identifiers are the same, and if not, performing the step of detecting whether a SA overlap record exists for the pairs of SA identifiers. Determining further includes determining, for a pair of SA identifiers, the non-stationary device to be motionless when pairs of SA identifiers are the same or when a SA overlap record exists.

According to a third aspect of the invention there is provided a location apparatus for use in collecting and detecting SA overlap noise within a wireless network. The wireless network including a plurality of SAs serving a plurality of devices and a SA overlap database. The plurality of devices include stationary devices and non-stationary devices. The SA overlap database including a plurality of SA overlap records, where each SA overlap record includes a pair of SA identifiers from the plurality of SAs. The location apparatus includes a receiver, a transmitter, a processor and a memory, where the processor is connected to the receiver, transmitter and memory. The receiver is configured to receive SA updates from the plurality of devices, where each SA update includes a device identifier identifying at least one of the devices and SA identifier of a SA serving at least one of the devices. The processor includes determining logic configured to determine whether each received SA update is associated with a stationary device. If the received SA update is associated with a stationary device, the processor further comprises: analysis logic configured to compare the received SA update with a corresponding previous SA update associated with the stationary device, and database logic configured to insert a SA overlap record into the SA overlap database when the received SA update is different to the corresponding previous SA update, the SA overlap record including the SA identifiers of the received SA update and the corresponding previous SA update associated with the stationary device.

As an option, if it is determined that the received SA update corresponds to a non-stationary device, the processor is further configured to store the received SA update for the non-stationary device. Additionally, the analysis logic may further include motion analysis logic for performing a motion analysis based on the stored received SA updates for one or more non-stationary devices and the SA overlap database.

Optionally, the motion analysis logic is configured to: detect, for each non-stationary device, whether a SA overlap record exists for pairs of SA identifiers of stored SA updates of said each non-stationary device, and determine said each non-stationary device to be motionless when a SA overlap record exists.

As an option, the processor is further configured to store the received SA update for the non-stationary device with a time stamp, and the motion analysis logic is further configured to detect whether a SA overlap record exists for pairs of SA identifiers of consecutive stored SA updates for the non-stationary device.

Optionally, the motion analysis logic may be further configured to detect whether pairs of SA identifiers are the same, and if not, performing the step of detecting whether a SA overlap record exists for the pairs of SA identifiers, and determine the non-stationary device to be motionless when pairs of SA identifiers are the same or when a SA overlap record exists.

According to the fourth aspect of the present invention there is provided an analysis apparatus for performing a mobility analysis within a wireless network including a plurality of SAs serving a plurality of devices, and a SA overlap database. The plurality of devices includes stationary devices and non-stationary devices. The SA overlap database including a plurality of SA overlap records, where each SA overlap record includes a pair of SA identifiers from the plurality of SAs, the pairs of SA identifiers associated with a pair of SAs serving a least one or the stationary devices. The analysis apparatus includes a receiver, a transmitter, a processor and a memory, where the processor is connected to the receiver, the transmitter and the memory. The receiver is configured to receive location information associated with one or more non-stationary devices. The location information including stored SA updates associated with the non-stationary devices, each SA update including the SA identifier of a SA serving the non-stationary device. The processor includes analysis logic configured to detect, for each non-stationary device, whether a SA overlap record exists for pairs of SA identifiers of stored SA updates of said each non-stationary device, and determine, for a pair of SA identifiers, that said each non-stationary device is motionless when a SA overlap record exists.

As an option, the stored SA updates associated with the non-stationary devices further includes a time stamp, and the analysis logic is further configured to detect, for each non-stationary device, whether a SA overlap record exists for pairs of SA identifiers of consecutive stored SA updates for said each non-stationary device. Optionally, the analysis logic is further configured to detect, for each non-stationary device, whether pairs of SA identifiers are the same, and if not, performing the step of detecting whether a SA overlap record exists for the pairs of SA identifiers, and determine, for a pair of SA identifiers, said each non-stationary device to be motionless when pairs of SA identifiers are the same or when a SA overlap record exists.

The invention provides the advantages of automatically determining which SA transitions do not represent movement of a non-stationary client device, which enables more accurate modeling of the mobility of a non-stationary client device without falsely regarding certain SA transitions as movement. The present invention provides the further advantage of detecting overlapping SAs within a wireless network without prior knowledge of the wireless network layout.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

In order to overcome the problems identified above with present location systems based on detecting service area (SA) transitions, methods and apparatus are described for use in handling SA swapping noise by receiving SA updates generated from multiple sources. It has been recognised that more and more devices are using wireless networks for connectivity (e.g. mobile phones, smart phones, and laptops, tablet computers, sensors, utility meters, credit card terminals, vehicle tracking systems in mobile networks). Surprisingly, many of these devices are, in fact, not mobile, but instead are regarded as stationary devices (e.g. sensors, utility meters). Examples of stationary devices include smart energy meters, credit card terminals, and refrigerators, which are configured to connect with mobile networks. In the future it is expected that the number of stationary devices will largely outnumber the number of non-stationary devices used in wireless networks.

The basic concept of the invention to provide a mechanism for only collecting and detecting SA swapping noise in a wireless network by receiving SA updates from a plurality of devices, in particular stationary devices. This can be achieved by recording changes in SA updates from a stationary device and determining that two of more SAs may currently serve the stationary device. This means these SAs may be identified as contributing to SA swapping noise. With this in mind, SA transitions between these SAs for a non-stationary device are not interpreted as movement of the device. However, SA transitions for a non-stationary device from these SAs to other SAs not contributing to SA swapping noise can be interpreted as a change of location or movement of the device.

The concept of the invention is to use stationary devices in wireless network that are known and/or verified to being motionless to identify SA-id changes that should not be interpreted as corresponding to non-stationary device movement. A verified stationary device (or motionless client) can be a wireless sensor, electrical smart meter, a road sensor, utility meter or basically any device that once deployed in a wireless network is not designed (or expected to) to move or change location. Once the stationary device identifiers are collected or known, it is possible to monitor which SA they are attached to over time and keep track of any SA-id change. The resulting collection of SA-id transitions can then be used to identify SA noise in logs of non-stationary devices.

Figure 1A:
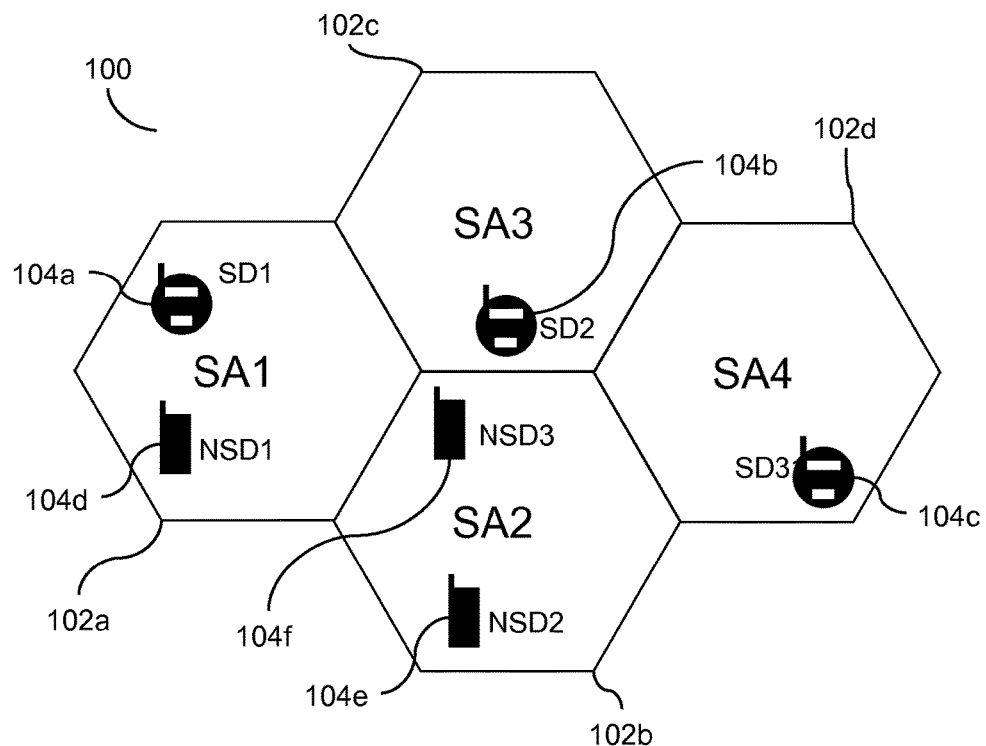
FIG. 1a is a schematic illustration of a wireless network comprises a plurality of SAs and a plurality of devices, the devices including stationary and non-stationary devices.
Figure 1B:
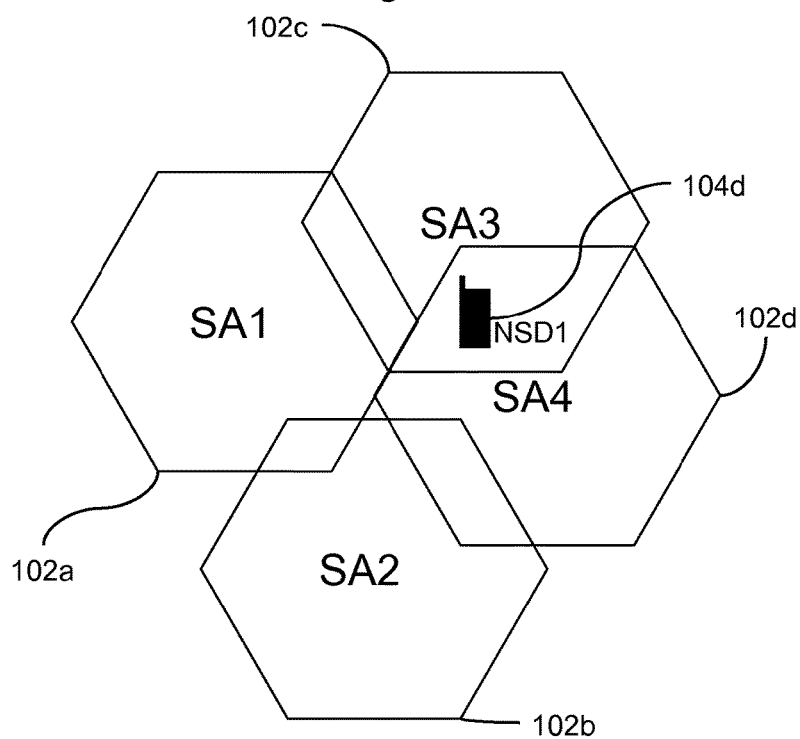
FIG. 1b is a schematic illustration of the wireless network of FIG. 1a in which some of the plurality of SAs now overlap and multiple SAs may serve the same non-stationary device.
Figure 1C:
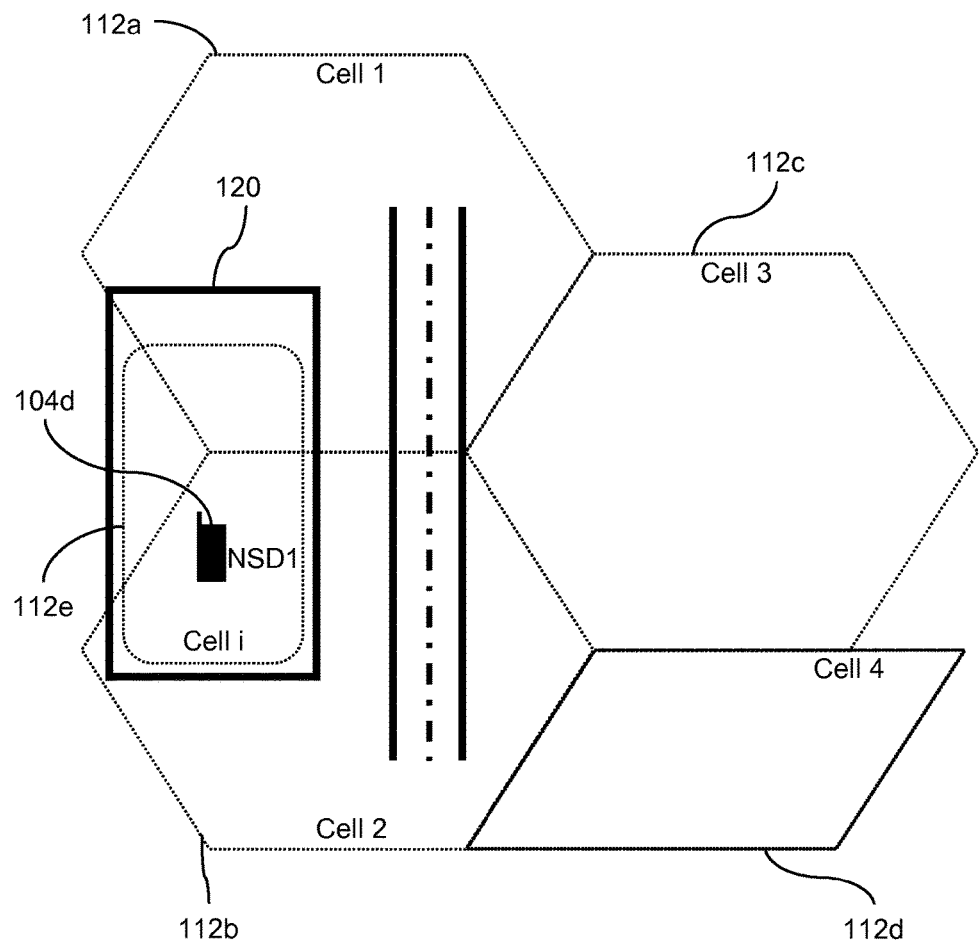
FIG. 1c is a schematic illustration of another example mobile network 1a in which some of the cells overlap with multiple cells serving the same non-stationary device.
Figure 2A:
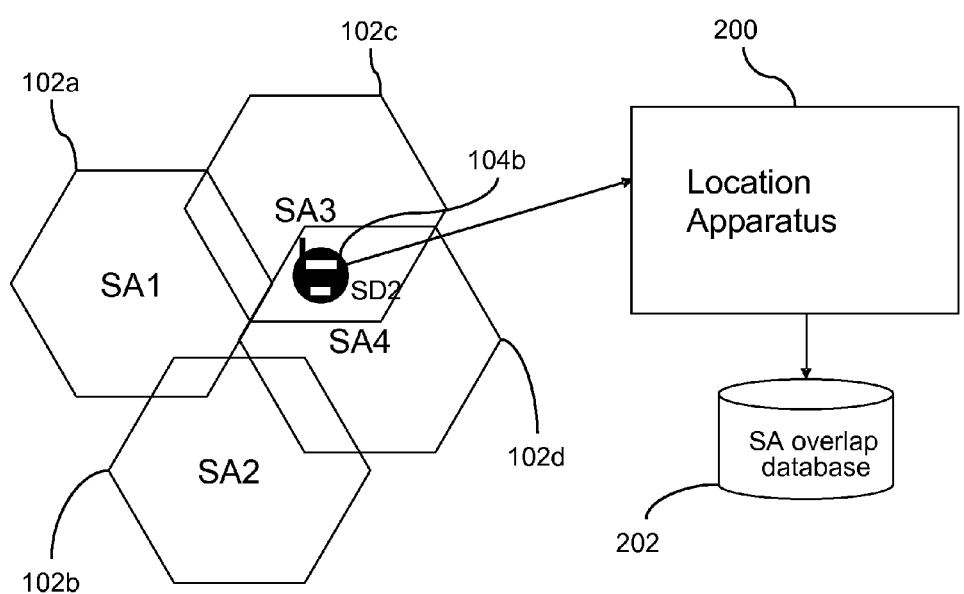
FIG. 2a is a schematic illustration of an example location apparatus according to the invention.

FIG. 2a is a schematic illustration of the basic components of an example location apparatus 200 in a wireless network 100 according to the invention. The location apparatus 200 records SA updates from stationary devices such as stationary device 104b. The SA updates may include a device identifier (e.g. a unique identifier that can be used to identify the service updates coming from the device), a SA identifier, and a timestamp. The SA updates are used to populate a SA overlap database 202 when a change of SA identifier is detected when stationary device 104b reports its location via the SA update; this may be the change of an SA identifier.

As an example, in FIG. 2a the stationary device 104b (SD2) may be a smart meter under the coverage of two overlapping SAs, SAs 102c and 102d (SA 3 and SA4). This stationary device will report being located in SA 102c (SA 3) or SA 102d (SA4), and will switch between these two SAs over time. Each time stationary device 104b (SD2) reports its location by sending SA updates, the location apparatus 200, knowing that stationary device 104b (SD2) is a fixed device, will compare the reported SA with SAs reported in the past. This may be achieved by comparing the SA identifiers in the reported SA update. If the newly reported cell is different, new records of detected overlapping SAs are added in the SA overlap database 202. It is noted that multiple stationary devices may report their location through SA updates.

The above process results in a new record being inserted into the SA overlap database. The service overlap database may simply be a list of pairs of SA identifiers representing a transition or change from one SA (e.g. SA A) to another SA (e.g. SA B) for a stationary device in the wireless network. For example, the first SA identifier may represent the previous SA and the second SA identifier may represent the new SA or vice versa. If the pair of service identifiers already exists in the list, then the new record does not need to be added.

By way of example only, this new record may take the following form in Table 3:

TABLE 3

| SA overlap database record | |
|---|---|
| SA A | SA B |
| SA3 | SA4 |

The first column of Table 3 may represent the old SA and the second column may represent the newly reported SA. In the above case, the previous SA that stationary device 104b reported was SA 102c (SA3) and the newly reported SA that stationary device 104b reported is SA 102d (SA4). While this record is in the SA overlap database 202 a SA transition from SA 102c (SA3) to SA 102d (SA4) or from SA 102d (SA4) to SA 102c (SA3) for any non-stationary device will not be interpreted as movement of the non-stationary device.

That is, once the above record is inserted in the SA overlap database 202, any non-stationary device updating its location from SA 102c (SA3) to SA 102d (SA4) or vice versa will not be considered as being in movement.

Each SA overlap record may also include a timestamp for use in updating the SA overlap database 202. For example, the timestamps may be used to remove SA overlap records that have been in the SA overlap database 202 for longer than a predetermined period of time, i.e. for a particular SA overlap record there may not have been a transition from one SA to another SA within the predetermined period of time, which means the SAs of the SA overlap record do not necessarily contribute any SA swapping noise anymore.

The location apparatus 200 may have a manually populated list of devices or a device database (not shown) for use in detecting or identifying from the service updates which devices are fixed or stationary. Alternatively or in addition to using a list of devices or device database, the location apparatus 200 may determine that a device is fixed or stationary using known ranges of device identifiers that are reserved for stationary devices, e.g. sensors that use specific modems or when a range of identifiers are reserved for the sensors.

Moreover, in the future it is envisaged that the number of stationary devices will outnumber the number of non-stationary devices. Therefore, instead of a list of devices that include only fixed or stationary devices, the list of devices may instead include device identifiers of known non-stationary devices. If a service update from a device is received by the location apparatus, then the device identifier may be assumed to be a stationary device if the device identifier cannot be located in the list of non-stationary devices.

Figure 2B:
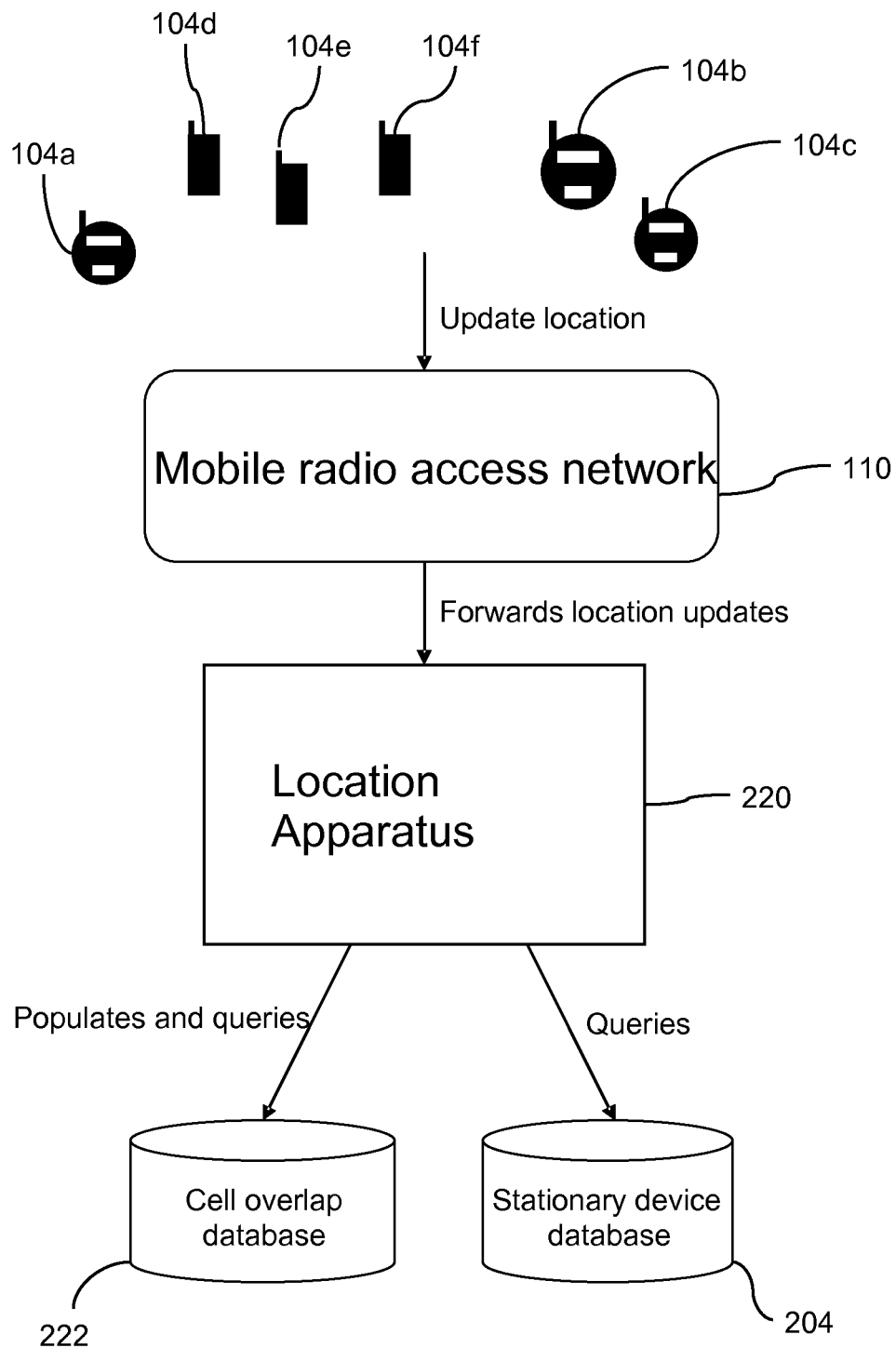
FIG. 2b is a schematic illustration of another example location apparatus according to the invention.

FIG. 2b is a schematic illustration of another example location apparatus 220 according to the invention. For simplicity, the reference numerals from FIGS. 1a to 2a have been re-used for the same or similar devices, systems and networks etc. In this example, the wireless network is mobile radio access network 110 and the plurality of SAs (not shown) is a plurality of cells (not shown) that are in communication with a plurality of devices 104a-104f. The plurality of devices 104a-104f includes stationary devices 104a-104c and non-stationary devices 104d-104f. However, this example is applicable to other wireless networks. The mobile network 110 is also in communication with location apparatus 220, which is in communication with a cell overlap database 222 and a stationary device database 204.

In operation, the mobile network 110 connects the plurality of devices 104a-104f to the rest of the network and forwards location updates or cell updates (i.e. SA updates) to the location apparatus 220 when devices 104a-104f actively update their location or when the devices 104a-104f are looked up by the mobile network 110 to receive a call or a short message. As the plurality of devices 104a-104f is attached to the mobile network 110, they can also periodically send location updates to the mobile network 110 when idle. In any event, on receiving the location updates from the plurality of devices 104a-104f the mobile network 110 forwards the location updates to the location apparatus 220.

The location updates may include data representative of a device identifier, cell identifier (i.e. a SA identifier), and a timestamp. The location apparatus 220 keeps track of the location of all the attached devices 104a-104f. When a location update is received from one of the devices 104a-104f, the identity of the device is checked to see if the device is stationary or non-stationary (i.e. motionless or mobile). This can be achieved by the location apparatus 220 querying the stationary device database 204 to determine whether the received location area update is from a stationary or non-stationary device. The stationary device database 204 contains a list of all identifiers of devices 104a-104c that are stationary. As an example, stationary device database 204 may include device records associated with stationary devices 104a-104c; it is to be appreciated that the stationary device database 204 could instead be a list of non-stationary devices or a non-stationary device database including device records associated with non-stationary devices 104d-104f.

If the device is a stationary device, then the location apparatus 220 may insert new cell overlap records into the cell overlap database 202. The cell overlap database 202 contains pairs of cells for which a transition from one to another cannot be interpreted as resulting from physical movement of a device. If the device is a non-stationary device then the cell overlap records can be used to confirm whether the device has changed location or not.

As an example, if the location update is associated with a stationary device 104a, then the location apparatus 220 determines whether the cell identifier (i.e. SA identifier) of the previous location update from the stationary device 104a has changed, and if it has, then the location apparatus 220 populates the cell overlap database 222 with a cell overlap record including data representative of a pair of identifiers such as the previous cell identifier and current cell identifier. The cell overlap records may include a timestamp such that the location apparatus 220 may remove cell overlap records after a predetermined period of time, update a cell overlap record with the most recent timestamp, or remove the cell overlap record when it is determined that the cell identifier from the location updates of the same stationary device or multiple stationary devices being served by the same pair of cells has not changed over a predetermined period of time.

If the location update is associated with a non-stationary device 104d, then the location apparatus 220 determines whether the non-stationary device 104d has moved based on the location update and previously stored location updates for the non-stationary device 104d. If the cell identifier of the previous location update is different to the cell identifier of the current location update and the pair of cell identifiers is not in the cell overlap database, then the non-stationary device 104d is determined to have changed location. Otherwise, the non-stationary device 104d is determined to not have changed location.

Figure 3:
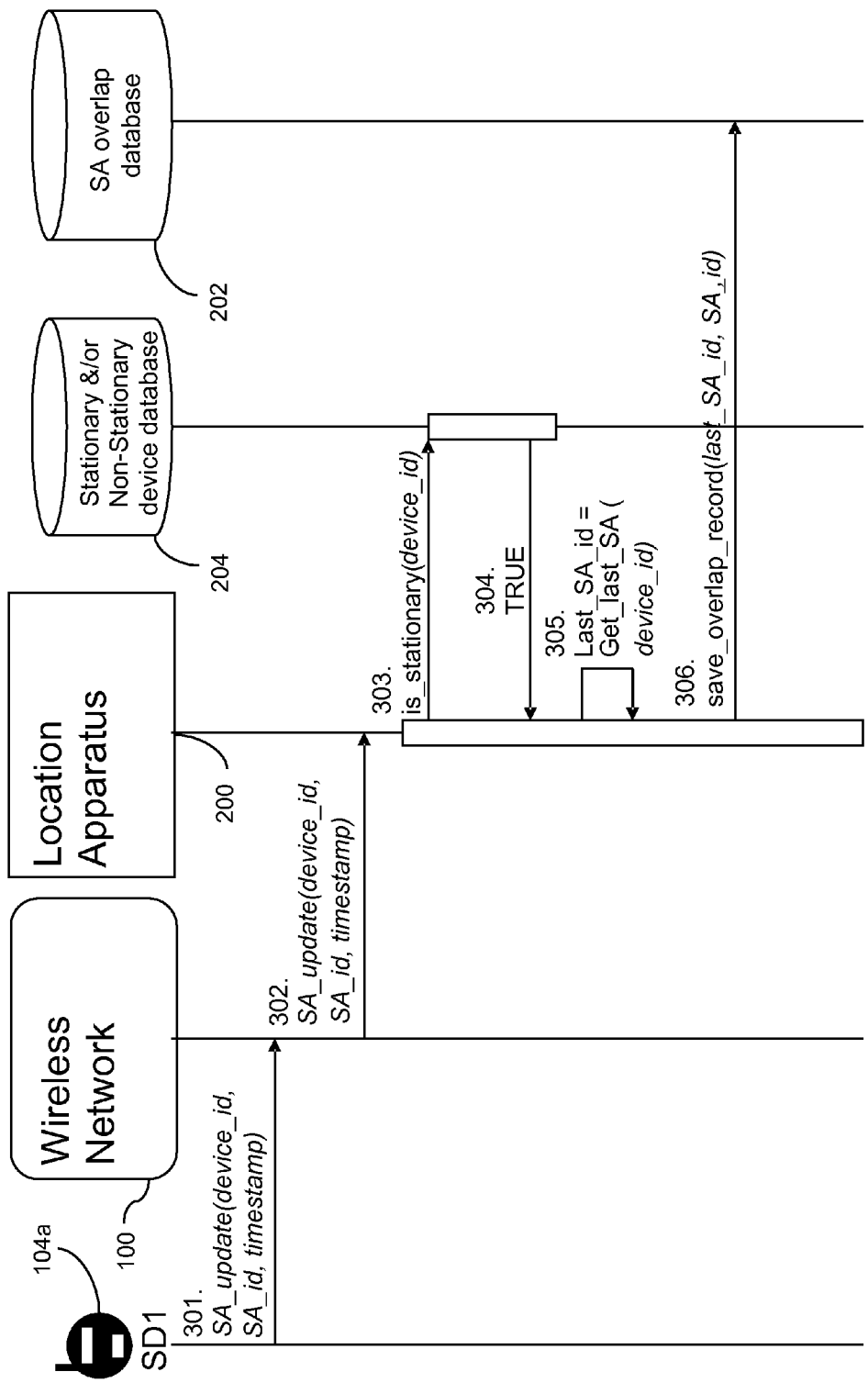
FIG. 3 is a signal flow diagram illustrating an example process for populating the SA overlap database according to the invention.

FIG. 3 is a signal flow diagram illustrating an example process for populating a SA overlap database 202 according to the invention. In this example, for simplicity, a stationary device 104a sends SA updates (SA updates) to wireless network 100, which forwards the SA updates to the location apparatus 200. It is to be appreciated that more than one stationary device will send SA updates to wireless network 100. The location apparatus 200 determines whether the stationary device 104a is motionless (i.e. stationary) and, if so, the location apparatus 200 populates the SA overlap database (SA overlap database) 202 depending on the previous SA update for the device. In particular, the SA overlap database is populated using the following process:

In step 301, the stationary device 104a updates its location to the wireless network 100. The SA update includes data representative of location update information including the device identifier (e.g. device_id), SA identifier (e.g. SA_id), and a timestamp (e.g. SA_update(device_id, SA_id, timestamp)).

In step 302, the wireless network 100 forwards the SA update information to the location apparatus 200.

In step 303, the location apparatus 200 checks if the non-stationary device 104a is motionless by querying a stationary and/or non-stationary device database 204 based on the device identifier (e.g. the query may take the form is_stationary_device(device_id)).

Based on the response from the device database 204, if the network knows for sure that the stationary device 104a never moves, then in step 304, the device database 204 may respond confirming the stationary device 104a is motionless (e.g. sends the response TRUE). Alternatively, the converse query could be sent e.g. is_nonstationary_device(device_id) with FALSE being the response when the device is a stationary device.

The device database 204 may be already populated with known stationary and/or non-stationary devices, and updated accordingly. The location of the stationary device 104a is recorded or stored for future reference, i.e. to enable the location apparatus 200 to determine whether to populate the SA overlap database 202.

In step 305, the location apparatus 200 retrieves the last recorded location or SA for the non-stationary device 104a (e.g. Last_SA_id=Get_last_SA(device_id)).

In step 306, the location apparatus 200 determines whether the previous SA location (e.g. last_SA_id) is different from the current location (e.g. the SA_id). If the previous SA location is different from the current SA location, then the location apparatus 200 saves the new record to the SA overlap database 202 (e.g. save_overlap_record (last_SA_id, SA_id)). The new record includes a pair of SA identifiers corresponding to the last SA identifier and the current SA identifier.

If the record already exists (i.e. there is a matching pair of SA identifiers), then a new record need not be entered. The service overlap records may include the timestamp of the service update to indicate when the SA last changed. So any existing records may still be updated with the current timestamp as this indicates that the pair of SAs are still contributing to SA overlap noise.

The location apparatus 200 or other apparatus may also review the timestamps of the SA overlap records to determine whether the SAs have recently changed. Those records with a timestamp older than a predetermined time period may be removed as the SAs may be considered not to contribute to SA overlap noise anymore. The process 300 is performed for all SA updates from all stationary devices 104a-104c in the wireless network 100.

Figure 4:
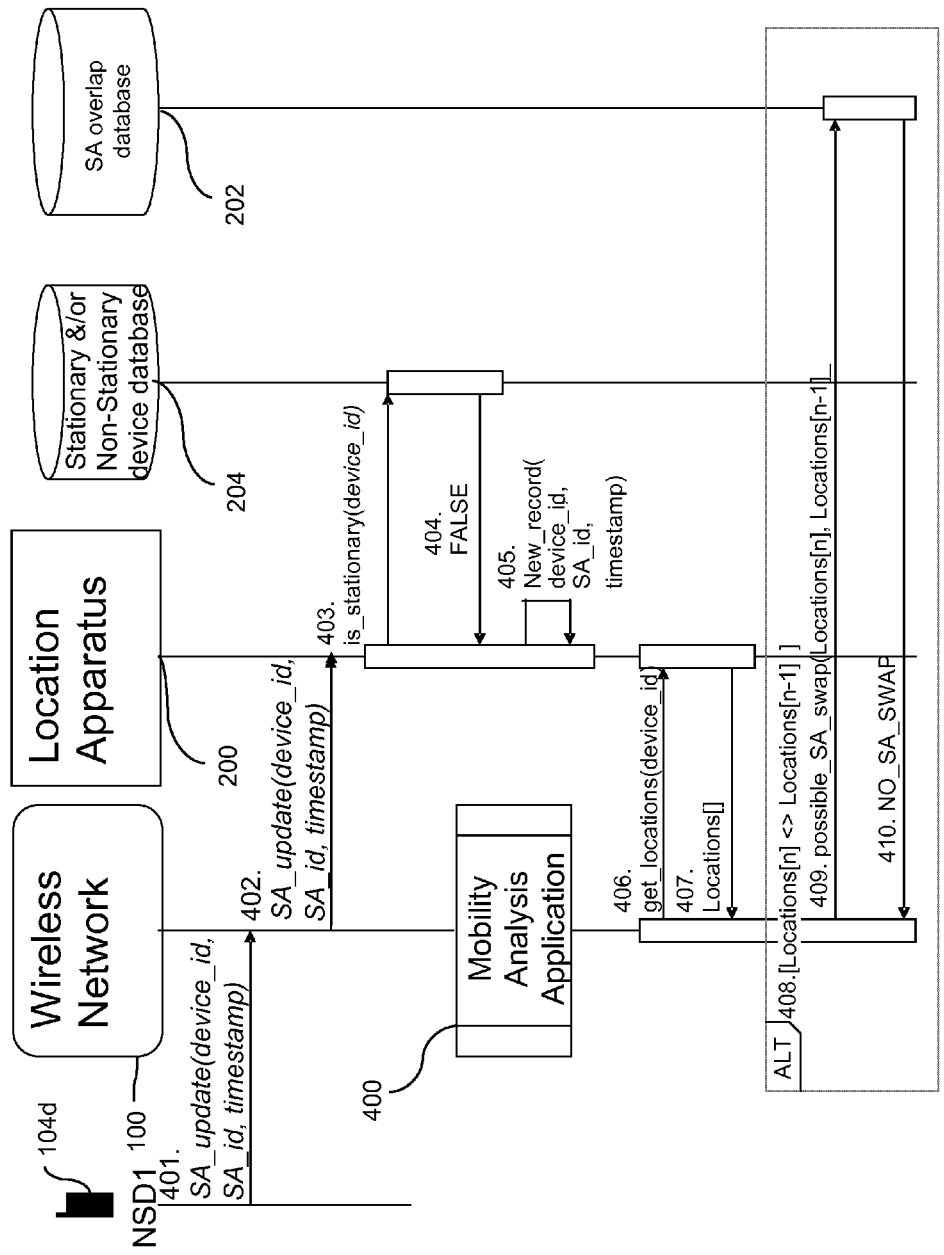
FIG. 4 is a signal flow diagram illustrating an example process for use in analysing the movement of non-stationary devices according to the invention using the SA overlap database populated in FIG. 3.

FIG. 4 is a signal flow diagram illustrating an example process for use in analysing the movement of non-stationary devices 104d-104f according to the invention using the SA overlap database 202 populated using the process described with reference to FIG. 3. In this example, a non-stationary device 104d sends location updates to wireless network 100, which forwards the SA updates to the location apparatus 200. The location apparatus 200 or a mobility analysis application 400 may perform a mobility analysis to determine whether the non-stationary device 104a is motionless or not (i.e. stationary) based on the stored SA updates of the non-stationary device 104a and the SA overlap database 202.

The querying of the SA overlap database 202 is done in two phases. In the first phase, the non-stationary device locations are stored in the location apparatus 200 as follows:

In step 401, the non-stationary device 104d updates its location to the wireless network 100 by sending a SA update including a device identifier (e.g. device_id), a SA identifier (SA_id), and a timestamp (e.g. SA_update(device_id, SA_id, timestamp)).

In step 402, the wireless network 100 forwards the SA update to the location apparatus 200.

In step 403, the location apparatus 200 checks if the non-stationary device 104d is a stationary or non-stationary device. This may be performed by querying the stationary and/or non-stationary device database 204 using the device identifier (e.g. is_motionless_device(device_id)).

In step 404, the device database 204 responds to the query confirming the non-stationary device 104d is a non-stationary device (e.g. in response to the query is_stationary_device(device_id), FALSE is returned because the device is non-stationary). Alternatively, the converse query could be sent e.g. is_nonstationary_device(device_id) with TRUE being the response when the device is a non-stationary device.

In step 405, the location apparatus 200 stores or records the SA location (e.g. SA_id) of the non-stationary device 104d (e.g. device_id) along with a timestamp (e.g. New_record(device_id, SA_id, timestamp)).

Once several SA locations have been recorded or stored for one or more non-stationary devices, the stored location information can then be queried by the location apparatus 200, or in this example, by a mobility analysis application 400.

In the second phase, for simplicity, the stored SA locations for non-stationary device 104d are analysed to determine the mobility of non-stationary device 104d based on the SA identifiers. It is to be appreciated that the stored SA locations of more than one non-stationary device may be analysed. The second phase process is as follows:

In step 406, the application 400 requests SA location information for non-stationary device 104d (e.g. get_locations(device_id)). Location information for multiple devices may be retrieved using multiple requests or one request listing the device identifiers.

In step 407, the SA locations for the non-stationary device 104d may be returned as a list of couples {timestamp, SA_id}. The list of couples may be ordered by timestamp so as to determine whether an SA_id change between consecutive couples in the list correspond to movement of the non-stationary device, i.e. a SA transition.

In step 408, for each consecutive pair of items or couples in the list, the application 400 first checks if the SA identifiers of the SA location updates are the same, and if it is not (e.g. SA_id[n]< >SA_id[n-1] or Locations[n]< >Locations[n-1]), then in step 409, the application 400 queries the SA overlap database 202 to check if the transition (e.g. the SA_id pair) can be interpreted as a physical movement or not. The transition is a physical movement if the pair of SA identifiers (e.g. SA_id[n] and SA_id[n-1]) are not found in a SA overlap record. In step 410, if the transition or pair of service identifiers is not in the SA overlap database, then the transition is determined to be a physical movement of the non-stationary device 104d (e.g. the SA overlap database 202 responds with NO_SA_SWAP). Otherwise, the transition is determined to not be a physical movement of the non-stationary device 104d and is recorded as such by the analysis application 400.

Having done this for each consecutive pair, the application 400 is now able to differentiate between transitions that can be interpreted as physical movement of the non-stationary device 104d and transitions that are just noise caused by overlap of SA coverage, which are critical to building accurate mobility models from network logs. This method also does not rely on any prior knowledge of the wireless network layout, all that is required for populating the SA overlap database 202 is a device database 204 or list of devices for identifying whether a device is stationary or non-stationary.

Figure 5A:
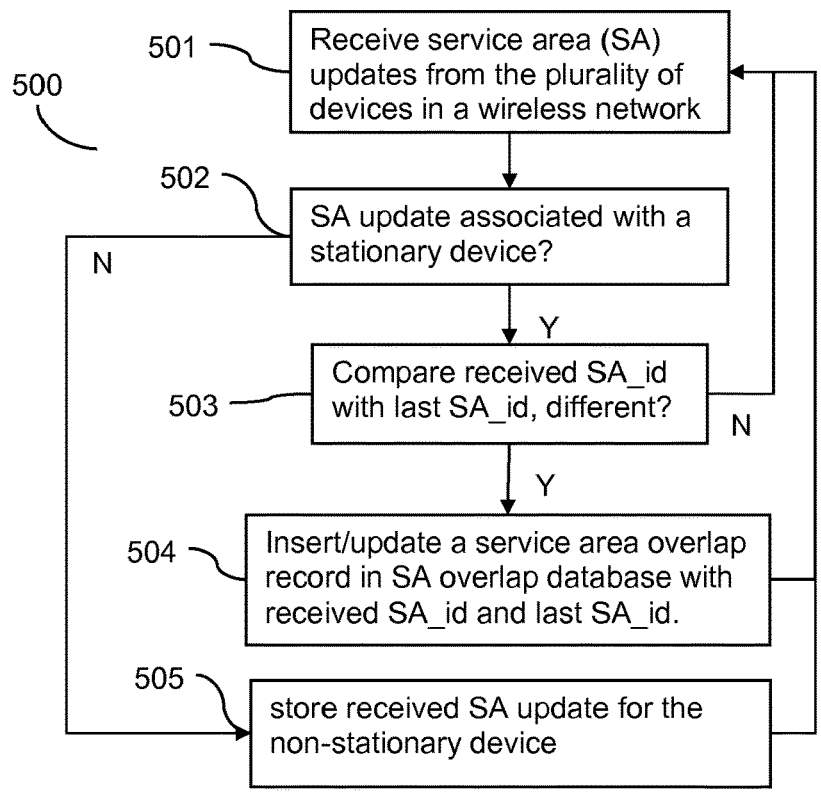
FIG. 5a is a flow diagram illustrating an example process according to the invention.

FIG. 5a is a flow diagram illustrating another example process 500 for operating a location apparatus for use in collecting and detecting SA swapping noise within a wireless network. In this example, the location updates are SA updates including data representative of at least a device identifier and a SA identifier. The wireless network includes a plurality of SAs serving a plurality of devices including stationary devices and non-stationary devices, and a SA overlap database. The SA overlap database includes a plurality of SA overlap records, where each SA overlap record includes a pair of SA identifiers from the plurality of SAs. The process 500 includes the steps of:

501. Receiving SA updates from the plurality of devices, where each SA update includes a device identifier identifying at least one of the devices and a SA identifier of a SA serving at least one of the devices.

502. Determining whether each received SA update is associated with a stationary device. If the SA update is associated with a non-stationary device then proceed to step 505. If the received SA update is associated with a stationary device, then proceed to step 503.

503. Comparing the received SA update with a corresponding previous SA update associated with the stationary device.

504. Inserting or updating a SA overlap record into the SA overlap database, when the received SA update is different to the corresponding previous SA update. The SA overlap record including the SA identifiers of the received SA update and the corresponding previous SA update associated with the stationary device. Proceed to step 501 for receiving further SA updates from the plurality of devices.

505. If it is determined that the received SA update corresponds to a non-stationary device, then store the received SA update for the non-stationary device. Proceed to step 501 for receiving further SA updates from the plurality of devices.

Step 504 may occur when the SA overlap database does not include a SA overlap record corresponding to the SA identifiers of the received SA update and the corresponding previous SA update.

Step 502, may also include checking a list of devices associated with identified stationary devices using the device identifier of each received SA update. Additionally or alternatively, step 502 may also include checking a list of devices associated with identified non-stationary devices using the device identifier of each received SA update. The list of devices may comprise a device database including device records associated with identified devices. It is to be appreciated that the list of devices may include one or more ranges of reserved identifiers of stationary or non-stationary devices.

As an example, the SA overlap records may include a timestamp indicating when the SA overlap record was inserted into the SA overlap database, the process 500 may further include maintaining the SA overlap database by removing one or more SA overlap records based on the time stamps. Alternatively or additionally, maintaining the SA overlap database may further include removing one or more SA overlap records when a SA overlap between a pair of SAs is no longer detected.

Figure 5B:
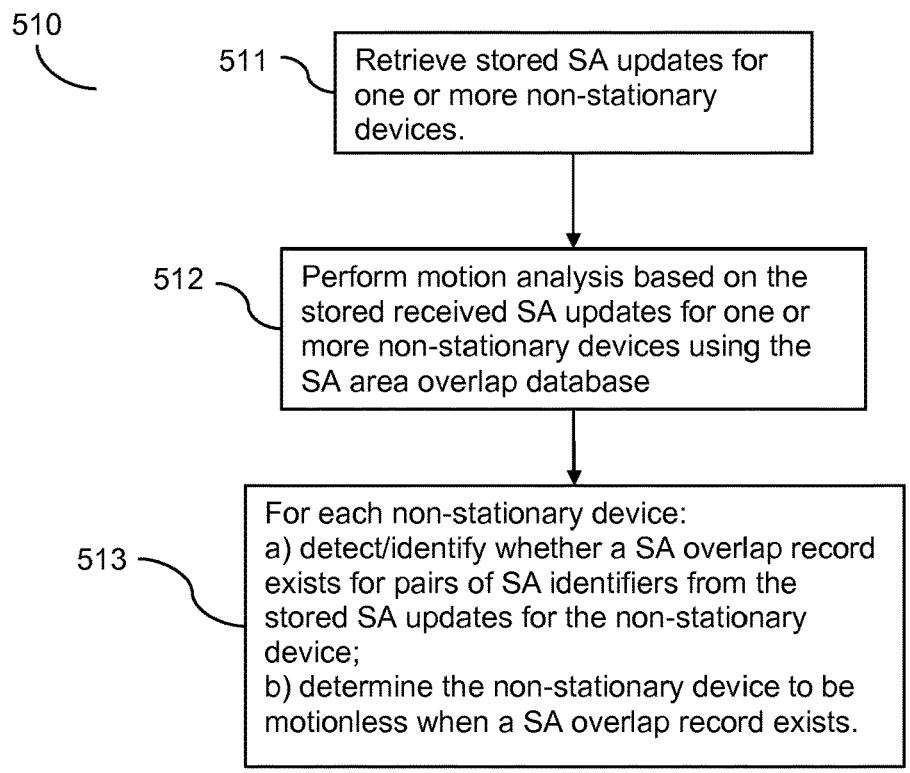
FIG. 5b is a flow diagram illustrating another example process according to the invention.

FIG. 5*b* is another flow diagram illustrating another example process 510 for analysing location updates using the collected and detected SA swapping noise of process 500 in a location system within the wireless network. The process 510 includes the steps of:
511. Retrieve stored SA updates for one or more non-stationary devices;
512. Perform a motion analysis based on the stored received SA updates for one or more non-stationary devices using the SA overlap database.
513. For each non-stationary device:
  a) detect/identify whether a SA overlap record exists for pairs of SA identifiers from the stored SA updates of the non-stationary device;
  b) determine the non-stationary device to be motionless for each pair of service identifiers when a SA overlap record exists.

In step 513, the motion analysis may further include, when the received SA updates for each non-stationary device are stored with a time stamp, detecting whether a SA overlap record exists for pairs of SA identifiers of consecutive stored SA updates for the non-stationary device. The stored SA updates can be ordered by the timestamp. Alternatively or additionally, the motion analysis may further include detecting whether pairs of SA identifiers are the same before checking whether the pairs of SA identifiers correspond to a SA overlap record. Determining the non-stationary device to be motionless for an SA transition when pairs of SA identifiers are the same and/or when an SA overlap record exists for the pairs of SA identifiers.

For example, assume a number of M SA updates, ordered by timestamps, are retrieved for a non-stationary device, where $1 < n \leq M$ and SA_id[n−1] is the SA identifier (SA_id) from the n−1th SA update, and SA_id[n] is the SA_id from the nth SA update. For each consecutive pair of SA updates, if SA_id[n]< >SA_id[n−1], then check if the pair SA_id[n] and SA_id[n−1] is a SA overlap record in the SA overlap database. Determine the non-stationary device to be motionless for transitions when pairs of SA_ids are the same (i.e. SA_id[n]=SA_id[n−1]) or when pairs of SA_ids (i.e. SA_id[n], SA_id[n−1]) correspond to a SA overlap record.

Figure 5C:
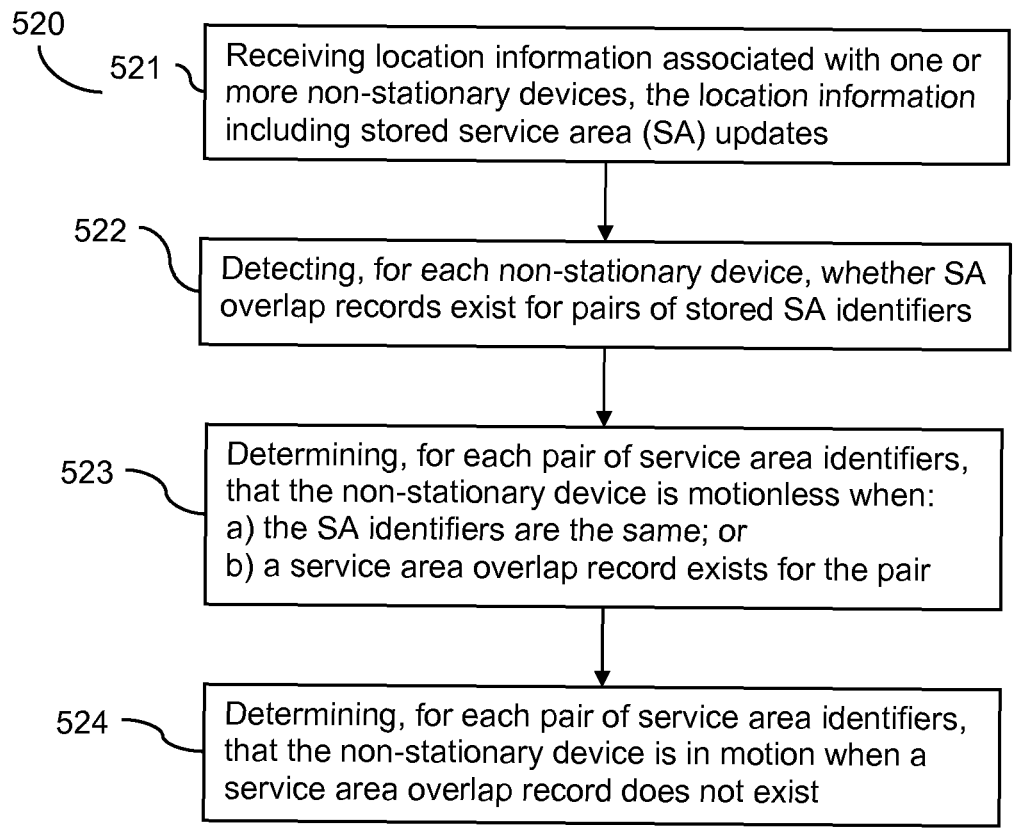
FIG. 5c is a flow diagram illustrating a further example process according to the invention.

FIG. 5*c* is a flow diagram illustrating a further example process 520 for analysing location updates or SA updates using the collected and detected SA swapping noise of process 500 within the wireless network. The process 520 performs a mobility analysis within the wireless network based on the following steps of:
521. Receiving location information associated with one or more non-stationary devices, the location information including stored SA updates associated with the non-stationary devices, each SA update including the SA identifier of a SA serving the non-stationary device.
522. Detecting, for each non-stationary device, whether a SA overlap record exists for pairs of SA identifiers of stored SA updates of a non-stationary device.
523. Determining, for a pair of SA identifiers, that the non-stationary device is motionless when:
  (a) a SA overlap record exists for the pair of SA identifiers; or
  (b) the pair of SA identifiers are the same.
524. Determining, for a pair of SA identifiers, that the non-stationary device is in motion when:
  (a) a SA overlap record does not exist for the pair of SA identifiers; and
  (b) the pair of SA identifiers are different.

When the stored SA updates associated with the non-stationary devices include a time stamp, then step 522 may further include detecting, for each non-stationary device, whether a SA overlap record exists for pairs of SA identifiers of consecutive stored SA updates for the non-stationary device. The stored SA updates can be ordered by the timestamps. Additionally or alternatively, detecting may further include detecting, for each non-stationary device, whether pairs of SA identifiers are the same, and if not, performing the step of detecting whether a SA overlap record exists for the pairs of SA identifiers, and determining, for a pair of SA identifiers, the non-stationary device to be motionless when pairs of SA identifiers are the same or when a SA overlap record exists.

Figure 6A:
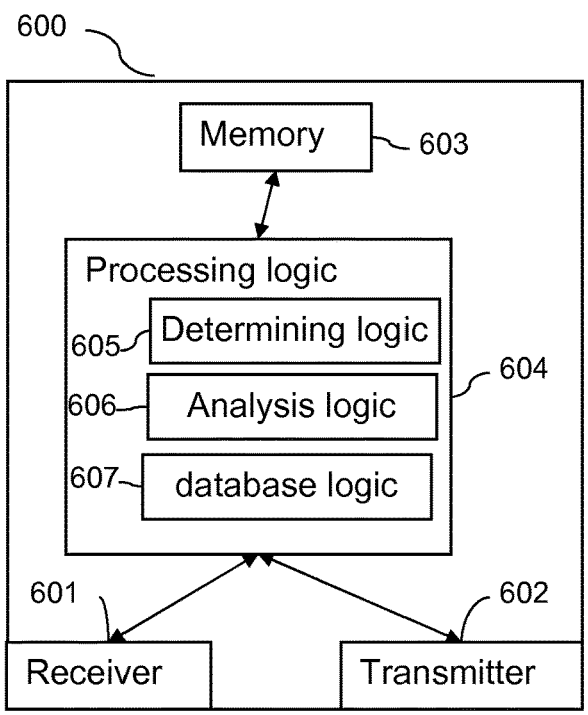
FIG. 6a is a schematic illustration of an example location apparatus according to the invention.

FIG. 6*a* illustrates an example apparatus 600 (e.g. a location system 200 or 220) for use in collecting and detecting SA overlap noise within a wireless network 100. For simplicity, the reference numerals of FIGS. 1*a*-2*b* may be used in relation to FIGS. 6*a* and 6*b* for illustration purposes. The wireless network 100 including a plurality of SAs 102*a*-102*d* serving a plurality of devices 104*a*-104*g* including stationary devices 104*a*-104*c* and non-stationary devices 104*d*-104*g* and a SA overlap database 202. The SA overlap database 202 including a plurality of SA overlap records, where each SA overlap record includes a pair of SA identifiers from the plurality of SAs 102*a*-102*d*. The apparatus 600 includes a receiver 601, a transmitter 602, a processor 604 and memory 605. The processor 604 being connected to the receiver 601, transmitter 602 and memory 603.

In operation, the receiver 601 is configured to receive SA updates from the plurality of devices 104*a*-104*g*, where each SA update includes a device identifier identifying at least one of the devices 104*a*-104*g* and SA identifier of a SA 102*a*-102*d* serving at least one of the devices 104*d*. The processor 604 includes determining logic 605 configured to determine whether each received SA update is associated with a stationary device 104*a*-104*c*.

If the received SA update is associated with a stationary device 104*a*-104*c*, the processor 604 further includes analysis logic 606 configured to compare the received SA update with a corresponding previous SA update associated with the stationary device 104*a*. The processor 604 further includes database logic 607 configured to insert a SA overlap record into the SA overlap database 202, when the received SA update is different to the corresponding previous SA update, the SA overlap record including the SA identifiers of the received SA update and the corresponding previous SA update associated with the stationary device 104*a*.

If it is determined that the received SA update corresponds to a non-stationary device 104*d*-104*g*, the processor 604 may be further configured to store the received SA update for the non-stationary device 104d-104g.

The analysis logic 606 may further include motion analysis logic for performing a motion analysis based on the stored received SA updates for one or more non-stationary devices 104d-104g and the SA overlap database 202. The motion analysis logic may be configured to detect, for each non-stationary device 104d, whether a SA overlap record exists for pairs of SA identifiers of stored SA updates of said each non-stationary device 104d, and determine said each non-stationary device 104d to be motionless when a SA overlap record exists.

The processor 604 may be further configured to store the received SA update for the non-stationary device 104d with a time stamp. The motion analysis logic may also be further configured to detect whether a SA overlap record exists for pairs of SA identifiers of consecutive stored SA updates for the non-stationary device.

The motion analysis logic may be further configured to detect whether pairs of SA identifiers are the same, and if not, performing the step of detecting whether a SA overlap record exists for the pairs of SA identifiers, and to determine the non-stationary device 104d to be motionless when pairs of SA identifiers are the same or when a SA overlap record exists.

Figure 6B:
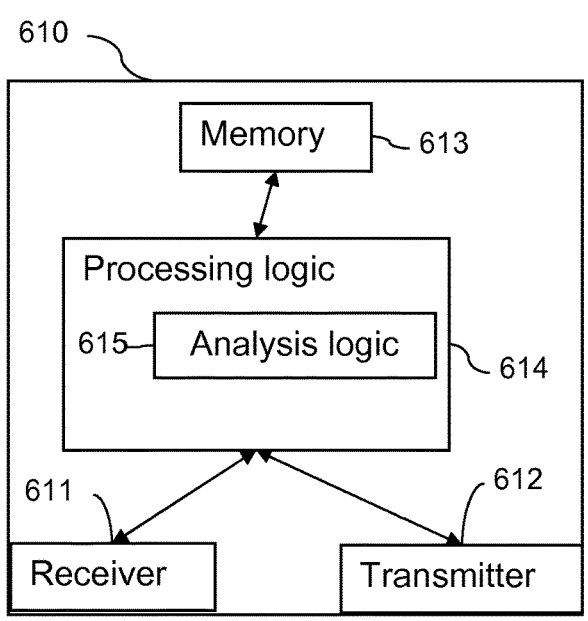
FIG. 6b is a schematic illustration of an example analysis apparatus according to the invention.

FIG. 6b illustrates an example apparatus 610 (analysis application 400) for performing a mobility analysis within the wireless network 100. The wireless network 100 including a plurality of SAs 102a-102d serving a plurality of devices 104a-104g including stationary devices 104a-104c and non-stationary devices 104d-104g and a SA overlap database 202 including a plurality of SA overlap records, where each SA overlap record includes a pair of SA identifiers from the plurality of SAs 102a-102d, the pairs of SA identifiers associated with a pair of SAs 102c-102c serving a least one of the stationary devices 104a. The apparatus 610 includes a receiver 611, a transmitter 612, a processor 614 and memory 613. The processor 614 being connected to the receiver 611, transmitter 614 and memory 613.

In operation, the receiver 611 is configured to receive location information associated with one or more non-stationary devices 104d-104g, the location information including stored SA updates associated with the non-stationary devices 104d-104g, each SA update including the SA identifier of a SA serving the non-stationary device 104d-104g. The processor 614 includes analysis logic 615 configured to detect, for each non-stationary device 104d-104g, whether a SA overlap record exists for pairs of SA identifiers of stored SA updates of said each non-stationary device 104d-104g and determine, for a pair of SA identifiers, that said each non-stationary device 104d-104g is motionless when a SA overlap record exists.

When the stored SA updates associated with the non-stationary devices 104d-104g include a time stamp, the analysis logic 615 may be further configured to detect, for each non-stationary device 104d-104g, whether a SA overlap record exists for pairs of SA identifiers of consecutive stored SA updates for said each non-stationary device 104d-104g.

The apparatus 600 for collecting and detecting SA swapping noise and the apparatus 610 for performing a mobility analysis as herein described can include memory units 603 and 613 and processors 604 and 614, which can be used for storing and executing a computer program, comprising computer readable code which, when executed by the processors 604 and 614, respectively, causes the apparatus 600 and 610 to perform the relevant methods, procedures, or processes of the invention as described herein. Such computer programs as described herein can be incorporated within one or more computer program products, each comprising a computer readable medium and one or more of the computer programs, where one or more of the computer programs are stored on the computer readable medium.

It will be appreciated by the person of skill in the art that various modifications may be made to the above described examples and/or embodiments without departing from the scope of the present invention.

The invention claimed is:

1. A method of operating a location apparatus for evaluating service area (SA) updates within a wireless network comprising a plurality of SAs serving a plurality of devices including stationary devices and non-stationary devices and further comprising a SA overlap database comprising a plurality of SA overlap records, wherein each SA overlap record includes a pair of SA identifiers from the plurality of SAs, the method comprising:

receiving SA updates from the plurality of devices, wherein each SA update includes a device identifier identifying at least one of the devices and SA identifier of a SA serving at least one of the devices;

determining whether each received SA update is associated with a stationary device; and, for each of one or more received SA updates associated with a stationary device, comparing the received SA update with a corresponding previous SA update associated with the stationary device and inserting an SA overlap record into the SA overlap database when the received SA update is different from the corresponding previous SA update, the SA overlap record including the SA identifiers of the received SA update and the corresponding previous SA update associated with the stationary device.

2. The method of claim 1, wherein the step of inserting the SA overlap record is performed in response to determining that the SA overlap database does not include a SA overlap record corresponding to the SA identifiers of the received SA update and the corresponding previous SA update.

3. The method of claim 1, wherein the step of determining includes checking a list of devices associated with identified stationary devices using the device identifier of each received SA update.

4. The method of claim 3, wherein the list of devices comprises a device database including device records associated with identified devices.

5. The method of claim 3, wherein the list of devices comprises one or more ranges of reserved identifiers of stationary or non-stationary devices.

6. The method of claim 1, wherein the step of determining further includes checking a list of devices associated with identified non-stationary devices using the device identifier of each received SA update.

7. The method of claim 1, wherein the SA overlap records include a time stamp indicating when the SA overlap record was inserted into the SA overlap database, the method further comprising the step of maintaining the SA overlap database by removing one or more SA overlap records based on the time stamps.

8. The method of claim 7, wherein maintaining the SA overlap database further includes removing one or more SA overlap records when a SA overlap between a pair of SAs is no longer detected.

9. The method of claim 1, wherein the method further comprises, for each of one or more received SA updates that are determined to correspond to non-stationary devices, storing the received SA update for the non-stationary device.

10. The method of claim 9, further comprising performing a motion analysis based on the stored received SA updates for one or more non-stationary devices and the SA overlap database.

11. The method of claim 10, wherein the motion analysis includes, for each non-stationary device, the steps of:
detecting whether a SA overlap record exists for pairs of SA identifiers of stored SA updates of a non-stationary device;
determining the non-stationary device to be motionless when a SA overlap record exists.

12. The method of claim 11, wherein the steps of:
storing the received SA updates further comprises storing the received SA update for the non-stationary device with a time stamp; and
detecting further comprises detecting whether a SA overlap record exists for pairs of SA identifiers of consecutive stored SA updates for the non-stationary device.

13. The method of claim 11, wherein:
said detecting whether a SA overlap record exists further comprises detecting whether pairs of SA identifiers are the same, and if not, performing the step of detecting whether a SA overlap record exists for the pairs of SA identifiers; and
said determining the non-stationary device to be motionless further comprises determining the non-stationary device to be motionless when pairs of SA identifiers are the same or when a SA overlap record exists.

14. A method of performing a mobility analysis within a wireless network comprising a plurality of service areas (SA) serving a plurality of devices including stationary devices and non-stationary devices and further comprising a SA overlap database comprising a plurality of SA overlap records, wherein each SA overlap record includes a pair of SA identifiers from the plurality of SAs, the pairs of SA identifiers associated with a pair of SAs serving a least one of the stationary devices, the method comprising:
receiving location information associated with one or more non-stationary devices, the location information including stored SA updates associated with the non-stationary devices, each SA update including the SA identifier of a SA serving the non-stationary device;
detecting, for each non-stationary device, whether a SA overlap record exists for pairs of SA identifiers of stored SA updates of a non-stationary device;
determining, for a pair of SA identifiers, that the non-stationary device is motionless when a SA overlap record exists.

15. The method of claim 14, wherein the stored SA updates associated with the non-stationary devices further comprise a timestamp, and the step of detecting further comprises detecting, for each non-stationary device, whether a SA overlap record exists for pairs of SA identifiers of consecutive stored SA updates for the non-stationary device.

16. The method of claim 14, wherein:
said detecting further comprises detecting, for each non-stationary device, whether pairs of SA identifiers are the same, and if not, performing the step of detecting whether a SA overlap record exists for the pairs of SA identifiers; and
said determining further comprises determining, for a pair of SA identifiers, the non-stationary device to be motionless when pairs of SA identifiers are the same or when a SA overlap record exists.

17. A location apparatus for use in collecting and detecting service area (SA) overlap noise within a wireless network comprising a plurality of SAs serving a plurality of devices including stationary devices and non-stationary devices and further comprising a SA overlap database comprising a plurality of SA overlap records, wherein each SA overlap record includes a pair of SA identifiers from the plurality of SAs, the location apparatus comprising:
a receiver, a transmitter, and a processing circuit comprising a processor and a memory, wherein the processing circuit is connected to the receiver, transmitter and memory, wherein:
the receiver is configured to receive SA updates from the plurality of devices, wherein each SA update includes a device identifier identifying at least one of the devices and SA identifier of a SA serving at least one of the devices; and
the processing circuit is configured to determine whether each received SA update is associated with a stationary device; and, for each received SA update that is determined to be associated with a stationary device, to:
compare the received SA update with a corresponding previous SA update associated with the stationary device; and
insert a SA overlap record into the SA overlap database, when the received SA update is different to the corresponding previous SA update, the SA overlap record including the SA identifiers of the received SA update and the corresponding previous SA update associated with the stationary device.

18. A location apparatus according to claim 17, wherein the processing circuit is further configured to store, for each of one or more received SA updates that are determined to correspond to non-stationary devices, the received SA update for the non-stationary device.

19. A location apparatus according to claim 18, wherein processing circuit is further configured to perform a motion analysis based on the stored received SA updates for one or more non-stationary devices and the SA overlap database.

20. A location apparatus according to claim 19, wherein the processing circuit is configured to perform a motion analysis that comprises:
detecting, for each non-stationary device, whether a SA overlap record exists for pairs of SA identifiers of stored SA updates of said each non-stationary device;
determining said each non-stationary device to be motionless when a SA overlap record exists.

21. A location apparatus according to claim 20, wherein the processing circuit is further configured to store the received SA update for the non-stationary device with a time stamp, and wherein the motion analysis comprises determining whether a SA overlap record exists for pairs of SA identifiers of consecutive stored SA updates for the non-stationary device.

22. A location apparatus according to claim 20, wherein the motion analysis further comprises:
detecting whether pairs of SA identifiers are the same, and if not, performing the step of detecting whether a SA overlap record exists for the pairs of SA identifiers;
determining the non-stationary device to be motionless when pairs of SA identifiers are the same or when a SA overlap record exists.

23. An analysis apparatus for performing a mobility analysis within a wireless network comprising a plurality of service areas (SAs) serving a plurality of devices including stationary devices and non-stationary devices and further comprising a SA overlap database comprising a plurality of SA overlap records, wherein each SA overlap record includes a pair of SA identifiers from the plurality of SAs, the pairs of SA identifiers associated with a pair of SAs serving a least one of the stationary devices, the analysis apparatus comprising:
- a receiver, a transmitter, and a processing circuit comprising a processor and a memory, wherein the processing circuit is connected to the receiver, the transmitter and the memory, wherein:
- the receiver is configured to receive location information associated with one or more non-stationary devices, the location information including stored SA updates associated with the non-stationary devices, each SA update including the SA identifier of a SA serving the non-stationary device; and
- the processing circuit is configured to:
  - detect, for each non-stationary device, whether a SA overlap record exists for pairs of SA identifiers of stored SA updates of said each non-stationary device; and
  - determine, for a pair of SA identifiers, that said each non-stationary device is motionless when a SA overlap record exists.

24. An apparatus according to claim 23, wherein the stored SA updates associated with the non-stationary devices further comprise a time stamp, and the processing circuit is further configured to detect, for each non-stationary device, whether a SA overlap record exists for pairs of SA identifiers of consecutive stored SA updates for said each non-stationary device.

25. An apparatus according to claim 23, wherein the processing circuit is further configured to:
- detect, for each non-stationary device, whether pairs of SA identifiers are the same, and if not, perform the step of detecting whether a SA overlap record exists for the pairs of SA identifiers;
- determine, for a pair of SA identifiers, said each non-stationary device to be motionless when pairs of SA identifiers are the same or when a SA overlap record exists.

* * * * *